United States Patent
Kato et al.

(10) Patent No.: US 9,009,269 B2
(45) Date of Patent: Apr. 14, 2015

(54) MEDIATION SERVER, CONTROL METHOD THEREFOR, COMMUNICATION DEVICE, CONTROL METHOD THEREFOR, ACCOUNT PROVISIONING SERVER, AND CONTROL METHOD THEREFOR

(75) Inventors: Ryoji Kato, Yokosuka (JP); Johan Hjelm, Tokyo (JP); Shingo Murakami, Yokohama (JP); Toshikane Oda, Tokyo (JP); Shinta Sugimoto, Kawasaki (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 272 days.

(21) Appl. No.: 13/808,321

(22) PCT Filed: Jul. 23, 2010

(86) PCT No.: PCT/JP2010/062971
§ 371 (c)(1),
(2), (4) Date: Jan. 4, 2013

(87) PCT Pub. No.: WO2012/011197
PCT Pub. Date: Jan. 26, 2012

(65) Prior Publication Data
US 2013/0124710 A1    May 16, 2013

(51) Int. Cl.
*G06F 15/16*    (2006.01)
*H04L 12/24*    (2006.01)
*G06Q 10/00*    (2012.01)
(Continued)

(52) U.S. Cl.
CPC .............. *H04L 41/50* (2013.01); *G06Q 10/00* (2013.01); *G06Q 30/00* (2013.01); *H04W 8/205* (2013.01); *H04W 12/08* (2013.01); *H04W 48/18* (2013.01)

(58) Field of Classification Search
USPC .................. 709/201–203, 219, 223, 224, 250
See application file for complete search history.

(56) References Cited

U.S. PATENT DOCUMENTS 6,829,619 B1 *  12/2004  Wakamatsu et al. ................. 1/1
7,624,193 B2 *  11/2009  Harrison et al. ............. 709/238
(Continued)

FOREIGN PATENT DOCUMENTS

EP          1 278 126 A1    1/2003
WO    WO 2008/040120 A1   4/2008

OTHER PUBLICATIONS

International Search Report, Application No. PCT/JP2010/062971, Oct. 5, 2010.

(Continued)

*Primary Examiner* — Sargon Nano
(74) *Attorney, Agent, or Firm* — Myers Bigel Sibley & Sajovec, P.A.

(57) ABSTRACT

In the first embodiment, the mobile phone 20 obtains the PCID from the CCE 10, and sends the PCID and the IMSI of the USIM of the mobile phone 20 to the CAPS 50. The MCC+MNC part of the IMSI is later used as the operator identification information by the mediation server 30, which is operated by the RO, in order to identify the SHO for the CCE 10. The MSIN part of the IMSI is later used as the user identification information by the account managing server 40, which is operated by the SHO, in order to identify the user of the mobile phone 20. The mediation server 30 forwards the account request from the CCE 10 to the account managing server 40 of the SHO identified by the operator identification information. The account managing server 40 generates the MCIM that is associated with the user identified by the user identification information.

8 Claims, 8 Drawing Sheets

(51) Int. Cl.
*G06Q 30/00* (2012.01)
*H04W 8/20* (2009.01)
*H04W 12/08* (2009.01)
*H04W 48/18* (2009.01)

(56) References Cited

U.S. PATENT DOCUMENTS

| | | | |
|---|---|---|---|
| 8,150,614 B2* | 4/2012 | Uyama | 701/420 |
| 2003/0120616 A1* | 6/2003 | Sueki et al. | 705/80 |
| 2004/0024845 A1* | 2/2004 | Fishhaut et al. | 709/219 |
| 2005/0096012 A1* | 5/2005 | Borella et al. | 455/411 |
| 2006/0200545 A1* | 9/2006 | Fromentoux et al. | 709/224 |
| 2008/0109513 A1* | 5/2008 | Fishhaut et al. | 709/203 |
| 2008/0189363 A1* | 8/2008 | Tian | 709/203 |
| 2008/0244004 A1* | 10/2008 | Philyaw | 709/203 |
| 2010/0031043 A1* | 2/2010 | Burger et al. | 713/170 |
| 2010/0115521 A1* | 5/2010 | Morisada et al. | 718/102 |
| 2011/0119151 A1* | 5/2011 | Chopra et al. | 705/26.25 |
| 2012/0054105 A1* | 3/2012 | Seo | 705/44 |
| 2012/0130638 A1* | 5/2012 | Uyama et al. | 701/533 |
| 2012/0173743 A1* | 7/2012 | Yu | 709/228 |
| 2012/0178418 A1* | 7/2012 | Yu | 455/411 |
| 2013/0143524 A1* | 6/2013 | Hjelm et al. | 455/410 |
| 2013/0252579 A1* | 9/2013 | Sugimoto et al. | 455/406 |

OTHER PUBLICATIONS

Written Opinion of the International Searching Authority, Application No. PCT/JP2010/062971, Oct. 5, 2010.

3GPP TR 33.812 V9.0.0 (Dec. 2009), Technical Report, 3$^{rd}$ Generation Partnership Project Technical Specification Group Services and System Aspects; Feasibility Study on the Security Aspects of Remote Provisioning and Change of Subscription for M2M Equipment (Release 9), Dec. 2009, 91 pp.

3GPP TS 33.220 V7.3.0 (Mar. 2006), Technical Report, 3$^{rd}$ Generation Partnership Project; Technical Specification Group Services and System Aspects; Generic Authentication Architecture (GAA); Generic bootstrapping architecture (Release 7), Mar. 2006, 69 pp.

* cited by examiner

FIG. 4

| CCE | SHO | (User) |
|---|---|---|
| PCID 1 | MCC+MNC1 | (MSIN 1) |
| PCID 2 | MCC+MNC2 | (MSIN 2) |
| ⋮ | ⋮ | ⋮ |

MEDIATION SERVER, CONTROL METHOD THEREFOR, COMMUNICATION DEVICE, CONTROL METHOD THEREFOR, ACCOUNT PROVISIONING SERVER, AND CONTROL METHOD THEREFOR

CROSS REFERENCE TO RELATED APPLICATION

This application is a 35 U.S.C. §371 national stage application of PCT International Application No. PCT/JP2010/062971, filed on 23 Jul. 2010, the disclosure and content of which is incorporated by reference herein in its entirety. The above-referenced PCT International Application was published in the English language as International Publication No. WO 2012/011197 A1 on 26 Jan. 2012.

TECHNICAL FIELD

The present invention generally relates to a mediation server, a control method therefor, a communication device, a control method therefor, an account provisioning server, and a control method therefor.

BACKGROUND

The 3rd Generation Partnership Project (3GPP) discusses remote provisioning of subscription for Machine-to-Machine equipment (M2ME) (see 3GPP TR 33.812 V9.0.0). According to TR 33.812, M2ME, which is a kind of a communication device, is provided with a temporary private identity called a Provisional Connectivity ID (PCID). The PCID follows the same format as an International Mobile Subscriber Identity (IMSI), and a network operator identified by the PCID is called a Registration Operator (RO). The M2ME accesses the RO using the PCID, and requests for subscription information called a Machine Communication Identity Module (MCIM). Upon request, the RO accesses another network operator called a Selected Home Operator (SHO), receives the MCIM issued by the SHO, and forwards the MCIM to the M2ME.

In this way, the M2ME is able to obtain the MCIM from the SHO via the RO using the PCID just one time, and thereafter, the M2ME is able to attach a 3GPP network using the MCIM.

The mechanism of TR 33.812 is convenient for a user of a communication device in that it is possible for the user to obtain subscription information for the communication device via a network.

However, the mechanism of TR 33.812 lacks flexibility in that it is difficult for a user of the M2ME to choose the SHO as he/she desires. Specifically, according to TR 33.812, a Downloading and Provisioning Function (DPF) of the RO queries the SHO associated with the PCID. In other words, the SHO, which shall provide the M2ME with the MCIM, is determined by associating the PCID with the SHO. Although TR 33.812 does not specify in detail how to associate a PCID with an SHO, a manufacturer or seller of the M2ME typically provides the M2ME with the PCID that is associated with a given SHO, and it is difficult for a user to associate the PCID with a desired SHO in a secure manner after the user obtains the M2ME.

Another problem involved in the mechanism of TR 33.812 relates to charging for use of an MCIM. As described above, once the M2ME obtains the MCIM of the SHO, the M2ME is able to attach a 3GPP network and perform communication using the MCIM. In order for the SHO to charge the user for the communication using the MCIM, it is necessary for the SHO to identify the user of the M2ME when the SHO provides the M2ME with its MCIM via the RO. However, TR 33.812 does not specify how the SHO identifies the user of the M2ME. Although the PCID identifies the M2ME, the PCID does not identify the user.

SUMMARY

The present invention is intended to address the above-described problem, and it is a feature thereof to introduce an improved technology for providing a communication device with subscription information via a network.

Note that "subscription information" is also referred to as "account information" in the present application, because the subscription information is associated with a charge account of the user.

According to the first aspect of the present invention, there is provided a mediation server for providing a first communication device with first account information, wherein the first account information is associated with second account information that enables a second communication device to be served by a network operator and the first account information enables the first communication device to be served by the network operator, the mediation server comprising:

a routing request receiving unit that receives, from an account provisioning server, a routing request including device identification information for identifying the first communication device and operator identification information for identifying the network operator;

a storing unit that stores the operator identification information in a memory in association with the device identification information;

an account request receiving unit that receives an account request and the device identification information from the first communication device;

a searching unit that searches the memory for the operator identification information that is associated with the device identification information received by the account request receiving unit;

an account request forwarding unit that forwards, to an account managing server of the network operator identified by the operator identification information found by the searching unit, the account request together with information that enables the account managing server to identify the second account information;

an account information receiving unit that receives the first account information from the account managing server as a response to the account request forwarded by the account request forwarding unit; and an account information forwarding unit that forwards the first account information to the first communication device.

According to the second aspect of the present invention, there is provided a method for controlling a mediation server for providing a first communication device with first account information, wherein the first account information is associated with second account information that enables a second communication device to be served by a network operator and the first account information enables the first communication device to be served by the network operator, the method comprising:

a routing request receiving step of receiving, from an account provisioning server, a routing request including device identification information for identifying the first communication device and operator identification information for identifying the network operator;

a storing step of storing the operator identification information in a memory in association with the device identification information;

an account request receiving step of receiving an account request and the device identification information from the first communication device;

a searching step of searching the memory for the operator identification information that is associated with the device identification information received in the account request receiving step;

an account request forwarding step of forwarding, to an account managing server of the network operator identified by the operator identification information found in the searching step, the account request together with information that enables the account managing server to identify the second account information;

an account information receiving step of receiving the first account information from the account managing server as a response to the account request forwarded in the account request forwarding step; and an account information forwarding step of forwarding the first account information to the first communication device.

According to the third aspect of the present invention, there is provided a communication device for providing another communication device with first account information, wherein the first account information is associated with second account information that enables the communication device to be served by a network operator and the first account information enables the other communication device to be served by the network operator, the communication device comprising:

an obtaining unit that obtains device identification information for identifying the other communication device; and a sending unit that sends, to an account provisioning server, the device identification information together with user identification information for identifying the second account information and operator identification information for identifying the network operator, wherein the account provisioning server sends the routing request that is received by the routing request receiving unit of the mediation server according to the first aspect of the invention.

According to the fourth aspect of the present invention, there is provided a method for controlling a communication device for providing another communication device with first account information, wherein the first account information is associated with second account information that enables the communication device to be served by a network operator and the first account information enables the other communication device to be served by the network operator, the method comprising:

an obtaining step of obtaining device identification information for identifying the other communication device; and a sending step of sending, to an account provisioning server, the device identification information together with user identification information for identifying the second account information and operator identification information for identifying the network operator, wherein the account provisioning server sends the routing request that is received by the routing request receiving unit of the mediation server according the first aspect of the invention.

According to the fifth aspect of the present invention, there is provided a communication device for providing another communication device with first account information, wherein the first account information is associated with second account information that enables the communication device to be served by a network operator and the first account information enables the other communication device to be served by the network operator, the communication device comprising:

an account request receiving unit that receives an account request from the other communication device;

an account request forwarding unit that forwards, to an account provisioning server, the account request together with user identification information for identifying the second account information and operator identification information for identifying the network operator, wherein the account provisioning server is configured to obtain, in response to the account request, the first account information from an account managing server of the network operator identified by the operator identification information;

an account information receiving unit that receives the first account information from the account provisioning server as a response to the account request forwarded by the account request forwarding unit; and an account information forwarding unit that forwards the first account information to the other communication device.

According to the sixth aspect of the present invention, there is provided a method for controlling a communication device for providing another communication device with first account information, wherein the first account information is associated with second account information that enables the communication device to be served by a network operator and the first account information enables the other communication device to be served by the network operator, the method comprising:

an account request receiving step of receiving an account request from the other communication device;

an account request forwarding step of forwarding, to an account provisioning server, the account request together with user identification information for identifying the second account information and operator identification information for identifying the network operator, wherein the account provisioning server is configured to obtain, in response to the account request, the first account information from an account managing server of the network operator identified by the operator identification information;

an account information receiving step of receiving the first account information from the account provisioning server as a response to the account request forwarded in the account request forwarding step; and an account information forwarding step of forwarding the first account information to the other communication device.

According to the seventh aspect of the present invention, there is provided an account provisioning server for providing a first communication device with first account information via a second communication device, wherein the first account information is associated with second account information that enables the second communication device to be served by a network operator and the first account information enables the first communication device to be served by the network operator, the account provisioning server comprising:

an account request receiving unit that receives, from the second communication device, an account request together with user identification information for identifying the second account information and operator identification information for identifying the network operator;

an account request forwarding unit that forwards, to an account managing server of the network operator identified by the operator identification information, the account request together with the user identification information;

an account information receiving unit that receives the first account information from the account managing server as a response to the account request forwarded by the account request forwarding unit; and an account information forwarding unit that forwards the first account information to the second communication device, wherein the second communication device forwards the first account information to the first communication device.

According to the eighth aspect of the present invention, there is provided a method for controlling an account provisioning server for providing a first communication device with first account information via a second communication device, wherein the first account information is associated with second account information that enables the second communication device to be served by a network operator and the first account information enables the first communication device to be served by the network operator, the method comprising:

an account request receiving step of receiving, from the second communication device, an account request together with user identification information for identifying the second account information and operator identification information for identifying the network operator;

an account request forwarding step of forwarding, to an account managing server of the network operator identified by the operator identification information, the account request together with the user identification information;

an account information receiving step of receiving the first account information from the account managing server as a response to the account request forwarded in the account request forwarding step; and an account information forwarding step of forwarding the first account information to the second communication device, wherein the second communication device forwards the first account information to the first communication device.

The main advantage of the present invention is as follows. If a user has a communication device (e.g., a mobile phone) provided with account information for a given network operator, it is possible for the user to provide another communication device (e.g., a digital photo frame) with another account information for the same network operator. Moreover, it is possible for the network operator to identify the user who should pay for the other account information when the network operator generates and provides the other account information to the user.

Further features of the present invention will become apparent from the following description of exemplary embodiments with reference to the attached drawings, in which like reference characters designate the same or similar parts throughout the figures thereof.

BRIEF DESCRIPTION OF DRAWINGS

FIG. 4 illustrates an example of the routing table stored in the memory 203;

DETAILED DESCRIPTION

First Embodiment

Figure 1:
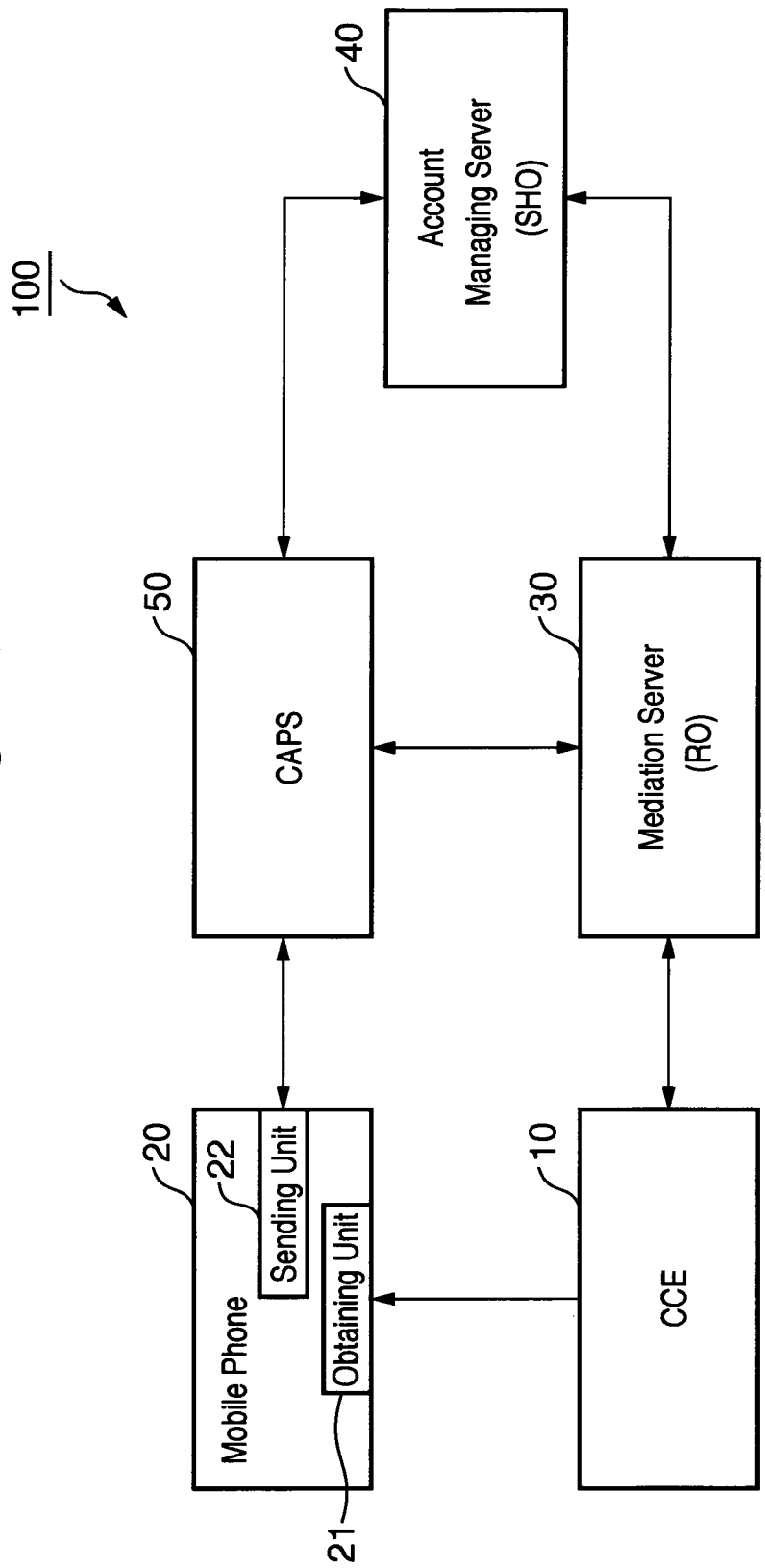
FIG. 1 illustrates an overview of a provisioning system 100 according to the first embodiment of the present invention.

FIG. 1 illustrates an overview of a provisioning system 100 according to the first embodiment of the present invention. In FIG. 1, Connected Consumer Electronics (CCE) 10 is a first communication device of a user, and contains a Provisional Connectivity ID (PCID). An example of the CCE 10 is a digital photo frame. Because the PCID identifies a communication device such as the CCE 10, the PCID can be used as device identification information for identifying the CCE 10. The CCE 10 is intended to obtain a Machine Communication Identity Module (MCIM) of a Selected Home Operator (SHO). Although the CCE 10 corresponds to Machine-to-Machine equipment (M2ME) described in TR 33.812, the term "CCE" is used in place of the term "M2ME" because communication made by the CCE 10 is not limited to machine-to-machine communication.

A mobile phone 20 is a second communication device of the user, and contains account information (e.g., a Universal Subscriber Identity Module (USIM) or an IMS Subscriber Identity Module (ISIM)) of a network operator. The subscription information enables the mobile phone 20 to access to a 3GPP network under the service by the network operator. In the provisioning system 100, the network operator that serves the mobile phone 20 also acts as the SHO for the CCE 10. The network operator charges the user of the mobile phone 20 through the account information.

The mobile phone 20 comprises an obtaining unit 21 and a sending unit 22. It should be noted that the functionality of each block in the mobile phone 20 may be implemented using dedicated hardware, using software executed by a processor (not shown), or a combination thereof. The detailed operations of each block in the mobile phone 20 will be described later with reference to the sequence diagram of FIG. 3.

A mediation server 30 is a server for providing the CCE 10 with the MCIM of the SHO. Although the mediation server 30 is illustrated as a single node, the functions of the mediation server 30 may be separated in two or more nodes. The mediation server 30 is operated by a Registration Operator (RO), which is identified by the PCID and serves the CCE 10 to enable the CCE 10 to access to a 3GPP network in order to obtain the MCIM.

An account managing server 40 is a server for managing the account information such as the USIM and MCIM. Although the account managing server 40 is illustrated as a single node, the functions of the account managing server 40 may be separated in two or more nodes. The account managing server 40 is operated by the SHO.

A charge account provisioning server (CAPS) 50 is a server for configuring the mediation server 30 and the account managing server 40 so that the MCIM is appropriately provided to the CCE 10 and the SHO can appropriately charge the user of the CCE 10. Although the CAPS 50 is illustrated as a single node, the functions of the CAPS 50 may be separated in two or more nodes. Moreover, the CAPS 50 may be integrated into the mobile phone 20, the mediation server 30, or the account managing server 40.

Figure 2:
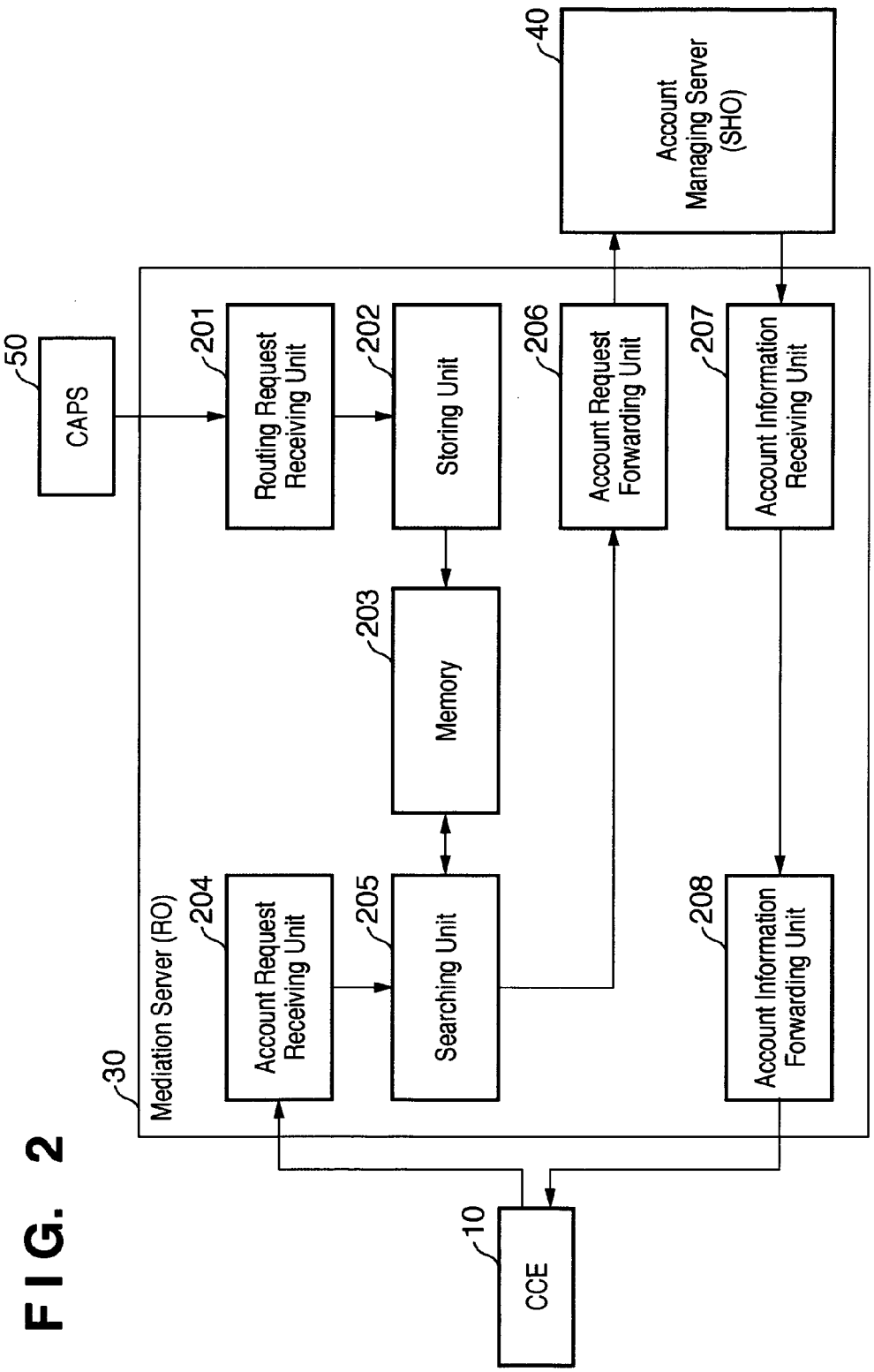
FIG. 2 is a functional block diagram of the mediation server 30.

FIG. 2 is a functional block diagram of the mediation server 30. The mediation server 30 comprises a routing request receiving unit 201, a storing unit 202, a memory 203, an account request receiving unit 204, a searching unit 205, an account request forwarding unit 206, an account information receiving unit 207, and an account information forwarding unit 208. It should be noted that the functionality of each block in the mediation server 30 may be implemented using dedicated hardware, using software executed by a processor (not shown), or a combination thereof. The detailed operations of each block in the mediation server 30 will be described later with reference to the sequence diagram of FIG. 3.

Figure 3:
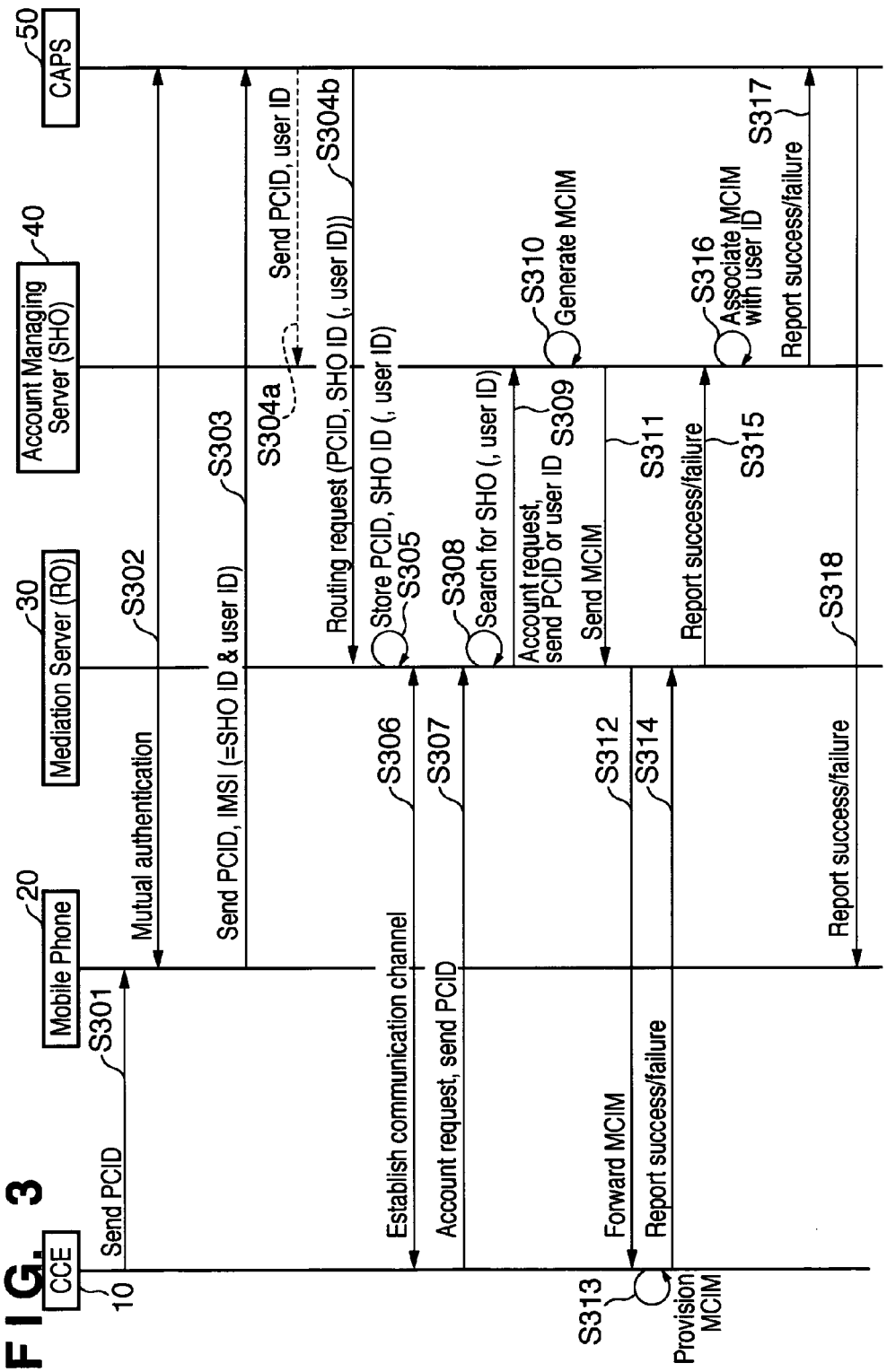
FIG. 3 is a sequence diagram illustrating an account provisioning procedure according to the first embodiment of the present invention.

FIG. 3 is a sequence diagram illustrating an account provisioning procedure according to the first embodiment of the present invention.

In step S301, the obtaining unit 21 of the mobile phone 20 obtains the PCID of the CCE 10. The transfer of the PCID from the CCE 10 to the mobile phone 20 may be performed over a secure bi-directional link between the CCE 10 and the mobile phone 20 in order to prevent a man-in-the-middle attack. Alternatively, the transfer may be performed over a uni-directional link from the CCE 10 to the mobile phone 20. Specifically, for example, a QR code reader provided in the mobile phone 20 may read QR code that is printed on the CCE 10 and represents the PCID, or an RFID reader provided in the mobile phone 20 may read an RFID tag that is provided in the CCE 10 and contains the PCID.

In step S302, the mobile phone 20 and the CAPS 50 authenticates each other. The authentication may be performed by means of, for example, a Generic Bootstrapping Architecture (GBA) specified in 3GPP TS 33.220 V7.3.0 (2006-03) with support from the USIM of the mobile phone 20. As a result of the authentication, a secure channel is established between the mobile phone 20 and the CAPS 50.

In step S303, the sending unit 22 of the mobile phone 20 sends the PCID to the CAPS 50 over the secure channel established in step S302. The sending unit 22 also sends an International Mobile Subscriber Identity (IMSI) contained in the USIM to the CAPS 50. Alternatively, the sending unit 22 may send the IMSI to the CAPS during the authentication procedure in step S302. Because the MCC+MNC part of the IMSI identifies the SHO and the MSIN part of the IMSI identifies the user of the mobile phone 20, the IMSI is used later as operator identification information for identifying the SHO and user identification information for identifying the user of the mobile phone 20.

In some embodiments, the processing of step S302 may be omitted, and in step S303, the sending unit 22 may send the PCID to the CAPS 50 via Short Message Service (SMS). In this case, a Mobile Subscriber ISDN Number (MSISDN), which can be used as the user identification information, is sent to the CAPS 50 via the SMS. Accordingly, it is not necessary for the sending unit 22 to send the MSIN part of the IMSI, and the sending unit 22 may send the MSIN part of the IMSI to the CAPS 50 as the operator identification information.

In step S304a, the CAPS 50 requests the account managing server 40 to prepare to generate the MCIM that is associated with the user of the mobile phone 20. In order to identify the user and the CCE 10, the CAPS 50 sends the PCID and the IMSI to the account managing server 40. It should be noted that the processing of step S304a may be omitted.

In step S304b, the CAPS 50 sends, to the mediation server 30, a routing request. The routing request includes the PCID and operator identification information (e.g., the MCC+MNC part of the IMSI) in order to identify the CCE 10 and the SHO.

The routing request receiving unit 201 of the mediation server 30 receives the routing request. In the case that the processing in step S304a has been omitted, it is necessary for the mediation server 30 to know the user of the mobile phone 20. In this case, the routing request further includes user identification information (e.g., the MSIN part of the IMSI).

In step S305, the storing unit 202 stores the MCC+MNC part of the IMSI in the memory 203 in association with the PCID. In the case that the processing in step S304a has been omitted, the storing unit 202 further stores the MSIN part of the IMSI in the memory 203 in association with the PCID. As a result of the processing in step S305, the routing table as shown in FIG. 4 is generated in the memory 203. In FIG. 4, the "User" column is generated in the case that the processing in step S304a has been omitted.

In step S306, the CCE 10 establishes a communication channel with the mediation server 30 using the PCID.

In step S307, the CCE 10 sends an account request and the PCID to the mediation server 30. The account request receiving unit 204 of the mediation server 30 receives the account request and the PCID. Alternatively, regarding the PCID, the account request receiving unit 204 may receive the PCID during the establishment procedure of the communication channel in step S306. In this step, the CCE 10 may also send CCE/TRE related information to the mediation server 30. The CCE/TRE related information is finally received by the account managing server 40 in step S309.

In step S308, the searching unit 205 searches the routing table stored in the memory 203 for the operator identification information (the MCC+MNC part of the IMSI) that is associated with the PCID received in step S307 (or step S306). Through the processing in step S308, the mediation server 30 recognizes which SHO is associated with the PCID of the CCE 10. In the case that the processing in step S304a has been omitted, the searching unit 205 further searches the routing table stored in the memory 203 for the user identification information (the MSIN part of the IMSI) that is associated with the PCID received in step S307 (or step S306).

In step S309, the account request forwarding unit 206 forwards, to the account managing server 40 of the SHO identified by the operator identification information found in step S308, the account request together with information that enables the account managing server 40 to identify the user (i.e., USIM) of the mobile phone 20. In the case that the processing in step S304a has been performed, the information may be the PCID because the PCID is associated with the user identification information (the MSIN part of the IMSI) in step S304a. In the case that the processing in step S304a has been omitted, the information may be the user identification information (the MSIN part of the IMSI) found in step S308.

In step S310, the account managing server 40 generates the MCIM. In the case that the account managing server 40 has received CCE/TRE related information in step S309, before generating the MCIM, the account managing server 40 may confirm the validity of the CCE 10 using a Platform Validation Authority (PVA) as specified in TR 33.812.

In step S311, the account managing server 40 sends the MCIM to the mediation server 30. The account information receiving unit 207 of the mediation server 30 receives the MCIM.

In step S312, the account information forwarding unit 208 forwards the MCIM to the CCE 10.

In step S313, the CCE 10 provisions the MCIM into its platform. As a result, the CCE 10 is able to access a 3GPP network under the service by the SHO.

In step S314, the CCE 10 reports the success (or failure) of the provisioning to the mediation server 30.

In step S315, the mediation server 30 forwards the report to the account managing server 40.

In step S316, upon reception of the report indicating "success", the account managing server 40 associates the MCIM, which has been generated in step S310, with the user (i.e., the USIM) of the mobile phone 20. The account managing server 40 is able to identify the user because the account managing server 40 has received the user identification information in step S304a or S309. As a result, the SHO is able to charge the user of the mobile phone 20 for use of the MCIM by the CCE 10. Alternatively, the account managing server 40 may associate the MCIM with the user in step S310, not step S316.

In step S317, the account managing server 40 reports the success (or failure) of the provisioning to the CAPS 50.

In step S318, the CAPS 50 forwards the report to the mobile phone 20.

As described above, according to the first embodiment of the present invention, the mobile phone 20 obtains the PCID from the CCE 10, and sends the PCID and the IMSI of the USIM of the mobile phone 20 to the CAPS 50. The MCC+MNC part of the IMSI is later used as the operator identification information by the mediation server 30, which is operated by the RO, in order to identify the SHO for the CCE 10. The MSIN part of the IMSI is later used as the user identification information by the account managing server 40, which is operated by the SHO, in order to identify the user of the mobile phone 20. The mediation server 30 forwards the account request from the CCE 10 to the account managing server 40 of the SHO identified by the operator identification information. The account managing server 40 generates the MCIM that is associated with the user identified by the user identification information.

Accordingly, it is possible for the user of the CCE 10 to choose the network operator, which serves the mobile phone 20 of the user, as the SHO associated with the PCID of the CCE 10. Moreover, it is possible for the SHO to identify the user of the CCE 10 who should pay for an access to the 3GPP network using the MCIM, and charge the identified user through the account information of the mobile phone 20.

Second Embodiment

Figure 5:
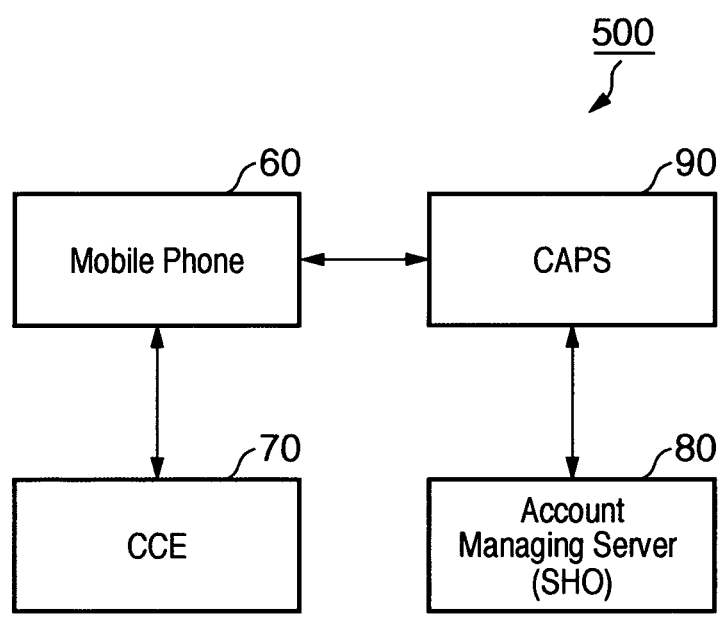
FIG. 5 illustrates an overview of a provisioning system 500 according to the second embodiment of the present invention.

FIG. 5 illustrates an overview of a provisioning system 500 according to the second embodiment of the present invention. As shown in FIG. 5, the provisioning system 500 is different from the provisioning system 100 in that the provisioning system 500 does not comprise a mediation server.

In FIG. 5, a mobile phone 60 is a communication device of a user, and contains account information (e.g., a USIM or an ISIM) of a network operator. The subscription information enables the mobile phone 60 to access to a 3GPP network under the service by the network operator. In the provisioning system 500, the network operator that serves the mobile phone 60 also acts as the SHO for a CCE 70, which is another communication device of the user. The network operator charges the user of the mobile phone 60 through the account information.

Connected Consumer Electronics (CCE) 70 is intended to obtain an MCIM of the SHO. However, in contrast to the first embodiment, the CCE 70 does not contain a PCID. Instead, the CCE 70 is configured to establish a secure bi-directional link with the mobile phone 60 and obtains the MCIM via the mobile phone 60. Although the CCE 70 corresponds to Machine-to-Machine equipment (M2ME) described in TR 33.812, the term "CCE" is used in place of the term "M2ME" because communication made by the CCE 70 is not limited to machine-to-machine communication.

An account managing server 80 is a server for managing the account information such as the USIM and MCIM. Although the account managing server 80 is illustrated as a single node, the functions of the account managing server 80 may be separated in two or more nodes. The account managing server 80 is operated by the SHO.

A charge account provisioning server (CAPS) 90 is a server for providing the CCE 70 with the MCIM via the mobile phone 60. Although the CAPS 90 is illustrated as a single node, the functions of the CAPS 90 may be separated in two or more nodes. Moreover, the CAPS 90 may be integrated into the mobile phone 60 or the account managing server 80.

Figure 6:
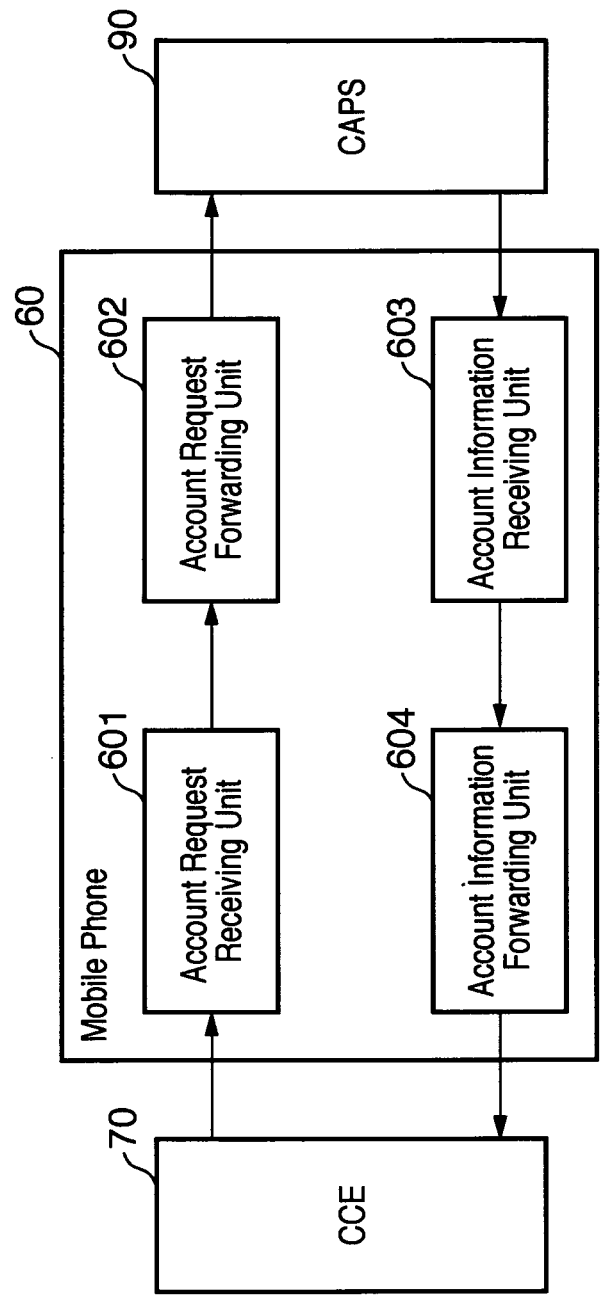
FIG. 6 is a functional block diagram of the mobile phone 60.

FIG. 6 is a functional block diagram of the mobile phone 60. The mobile phone 60 comprises an account request receiving unit 601, an account request forwarding unit 602, an account information receiving unit 603, and an account information forwarding unit 604. It should be noted that the functionality of each block in the mobile phone 60 may be implemented using dedicated hardware, using software executed by a processor (not shown), or a combination thereof. The detailed operations of each block in the mobile phone 60 will be described later with reference to the sequence diagram of FIG. 8.

Figure 7:
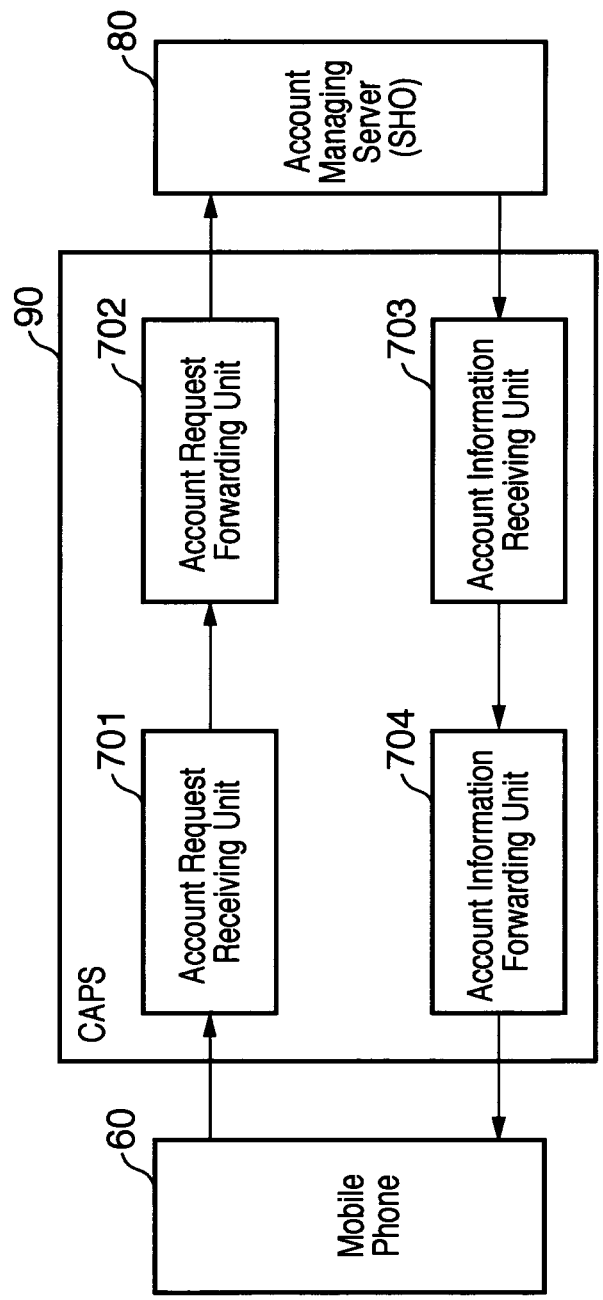
FIG. 7 is a functional block diagram of the CAPS 90.

FIG. 7 is a functional block diagram of the CAPS 90. The CAPS 90 comprises an account request receiving unit 701, an account request forwarding unit 702, an account information receiving unit 703, and an account information forwarding unit 704. It should be noted that the functionality of each block in the CAPS 90 may be implemented using dedicated hardware, using software executed by a processor (not shown), or a combination thereof. The detailed operations of each block in the CAPS 90 will be described later with reference to the sequence diagram of FIG. 8.

Figure 8:
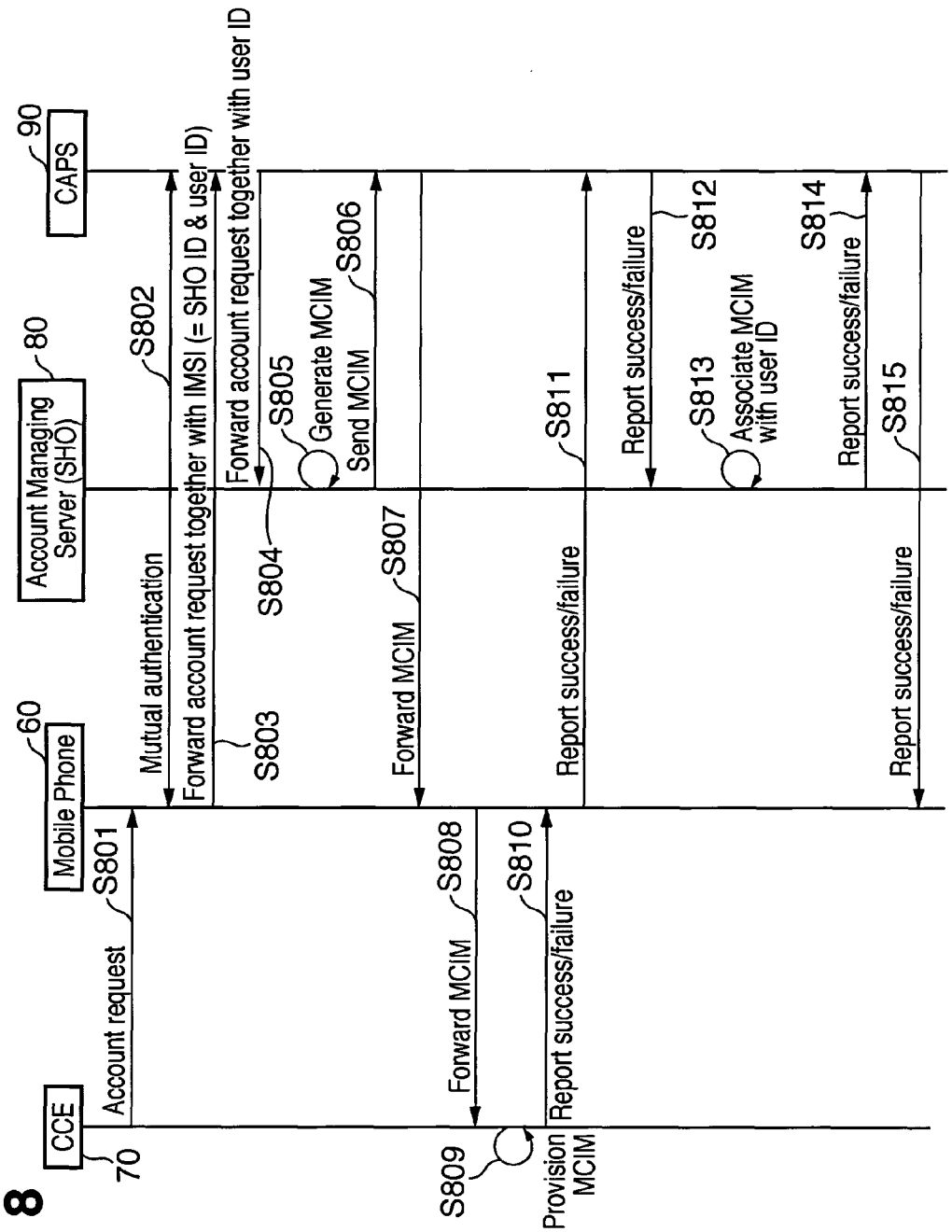
FIG. 8 is a sequence diagram illustrating an account provisioning procedure according to the second embodiment of the present invention.

FIG. 8 is a sequence diagram illustrating an account provisioning procedure according to the second embodiment of the present invention.

In step S801, the CCE 70 establishes a secure bi-directional link with the mobile phone 60, and sends an account request to the mobile phone 60. The account request receiving unit 601 of the mobile phone 60 receives the account request. In this step, the CCE 70 may also send CCE/TRE related information to the mobile phone 60. The CCE/TRE related information is finally received by the account managing server 80 in step S804.

In step S802, the mobile phone 60 and the CAPS 90 authenticates each other in a similar way to step S302 of FIG. 3. As a result of the authentication, a secure channel is established between the mobile phone 60 and the CAPS 90.

In step S803, the account request forwarding unit 602 of the mobile phone 60 forwards, to the CAPS 90, the account request together with the IMSI of the USIM of the mobile phone 60. The account request receiving unit 701 of the CAPS 90 receives the account request. Because the MCC+MNC part of the IMSI identifies the SHO and the MSIN part of the IMSI identifies the user of the mobile phone 60, the IMSI is used later as operator identification information for identifying the SHO and user identification information for identifying the user of the mobile phone 60.

In step S804 the account request forwarding unit 702 of the CAPS 90 forwards, to the account managing server 80 operated by the SHO identified by the operator identification information (e.g., the MCC+MNC part of the IMSI), the account request together with the user identification information (e.g., the MSIN part of the IMSI).

In step S805, the account managing server 80 generates the MCIM. In the case that the account managing server 80 has received CCE/TRE related information in step S804, before generating the MCIM, the account managing server 80 may confirm the validity of the CCE 70 using a Platform Validation Authority (PVA) as specified in TR 33.812.

In step S806, the account managing server 80 sends the MCIM to the CAPS 90. The account information receiving unit 703 of the CAPS 90 receives the MCIM.

In step S807, the account information forwarding unit 704 of the CAPS 90 forwards the MCIM to the mobile phone 60. The account information receiving unit 603 of the mobile phone 60 receives the MCIM.

In step S808, the account information forwarding unit 604 of the mobile phone 60 forwards the MCIM to the CCE 70.

In step S809, the CCE 70 provisions the MCIM into its platform. As a result, the CCE 70 is able to access a 3GPP network under the service by the SHO.

In step S810, the CCE 70 reports the success (or failure) of the provisioning to the mobile phone 60.

In step S811, the mobile phone 60 forwards the report to the CAPS 90.

In step S812, the CAPS 90 forwards the report to the account managing server 80.

In step S813, upon reception of the report indicating "success", the account managing server 80 associates the MCIM, which has been generated in step S805, with the user (i.e., the USIM) of the mobile phone 60. The account managing server 80 is able to identify the user because the account managing server 80 has received the user identification information in step S804. As a result, the SHO is able to charge the user of the mobile phone 60 for use of the MCIM by the CCE 70. Alternatively, the account managing server 80 may associate the MCIM with the user in step S805, not step S813.

In step S814, the account managing server 80 reports the success (or failure) of the provisioning to the CAPS 90.

In step S815, the CAPS 90 forwards the report to the mobile phone 60.

As described above, according to the second embodiment of the present invention, the mobile phone 60 obtains the MCIM on behalf of the CCE 70 from the account managing server 80 of the network operator, which serves the mobile phone 60 and also acts as the SHO for the CCE 70. When the mobile phone 60 tries to obtain the MCIM, it sends the IMSI of the USIM of the mobile phone 60 to the account managing server 80 via the CAPS 90. The account managing server 80 identifies the user of the mobile phone 60 based on the MSIN part of the IMSI, and generates the MCIM that is associated with the identified user.

Accordingly, it is possible for the user of the CCE 70 to choose the network operator, which serves the mobile phone 60 of the user, as the SHO for the CCE 70. Moreover, it is possible for the SHO to identify the user of the CCE 70 who should pay for an access to the 3GPP network using the MCIM, and charge the identified user through the account information of the mobile phone 60. Furthermore, because it is not necessary for the CCE 70 to have the PCID and access the RO, a manufacturer or seller of the CCE 70 is released from the cost relating to the preparation of the PCID and the communication between the CCE 70 and the RO.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A mediation server for providing a first communication device with first account information, wherein the first account information is associated with second account information that enables a second communication device to be served by a network operator and the first account information enables the first communication device to be served by the network operator, the mediation server comprising:
   a routing request receiving unit that receives, from an account provisioning server, a routing request including device identification information for identifying the first communication device and operator identification information for identifying the network operator;
   a storing unit that stores the operator identification information in a memory in association with the device identification information;
   an account request receiving unit that receives an account request and the device identification information from the first communication device;
   a searching unit that searches the memory for the operator identification information that is associated with the device identification information received by the account request receiving unit;
   an account request forwarding unit that forwards, to an account managing server of the network operator identified by the operator identification information found by the searching unit, the account request together with information that enables the account managing server to identify the second account information;
   an account information receiving unit that receives the first account information from the account managing server as a response to the account request forwarded by the account request forwarding unit; and
   an account information forwarding unit that forwards the first account information to the first communication device.

2. The mediation server according to claim 1, wherein:
   the routing request receiving unit further receives, from the account provisioning server, user identification information for identifying the second account information;
   the storing unit further stores the user identification information in the memory in association with the device identification information;
   the searching unit further searches the memory for the user identification information that is associated with the device identification information received by the account request receiving unit; and
   the account request forwarding unit uses the user identification information as said information that enables the account managing server to identify the second account information.

3. The mediation server according to claim 1, wherein:
   the account provisioning server obtains, from the second communication device, the device identification information, the operator identification information, and user identification information for identifying the second account information;
   the account provisioning server sends, to the account managing server of the network operator identified by the operator identification information, the device identification information in association with the user identification information; and
   the account request forwarding unit uses the device identification information as said information that enables the account managing server to identify the second account information.

4. The mediation server according to claim 1, wherein:
   the device identification information is a Provisional Connectivity ID;
   the first account information is a Machine Communication Identity Module; and the second account information is a Universal Subscriber Identity Module or an IMS Subscriber Identity Module.

5. A method for controlling a mediation server for providing a first communication device with first account information, wherein the first account information is associated with second account information that enables a second communication device to be served by a network operator and the first account information enables the first communication device to be served by the network operator, the method comprising:

a routing request receiving step of receiving, from an account provisioning server, a routing request including device identification information for identifying the first communication device and operator identification information for identifying the network operator;

a storing step of storing the operator identification information in a memory in association with the device identification information;

an account request receiving step of receiving an account request and the device identification information from the first communication device;

a searching step of searching the memory for the operator identification information that is associated with the device identification information received in the account request receiving step;

an account request forwarding step of forwarding, to an account managing server of the network operator identified by the operator identification information found in the searching step, the account request together with information that enables the account managing server to identify the second account information;

an account information receiving step of receiving the first account information from the account managing server as a response to the account request forwarded in the account request forwarding step; and an account information forwarding step of forwarding the first account information to the first communication device.

6. A communication device for providing another communication device with first account information, wherein the first account information is associated with second account information that enables the communication device to be served by a network operator and the first account information enables the other communication device to be served by the network operator, the communication device comprising:

an obtaining unit that obtains device identification information for identifying the other communication device; and a sending unit that sends, to an account provisioning server, the device identification information together with user identification information for identifying the second account information and operator identification information for identifying the network operator, wherein the account provisioning server sends the routing request that is received by the routing request receiving unit of the mediation server according to claim 1.

7. The communication device according to claim 6, wherein:

the first account information is a Machine Communication Identity Module; and the second account information is a Universal Subscriber Identity Module or an IMS Subscriber Identity Module.

8. A method for controlling a communication device for providing another communication device with first account information, wherein the first account information is associated with second account information that enables the communication device to be served by a network operator and the first account information enables the other communication device to be served by the network operator, the method comprising:

an obtaining step of obtaining device identification information for identifying the other communication device; and a sending step of sending, to an account provisioning server, the device identification information together with user identification information for identifying the second account information and operator identification information for identifying the network operator, wherein the account provisioning server sends the routing request that is received by the routing request receiving unit of the mediation server according to claim 1.

* * * * *